(12) United States Patent
Shih et al.

(10) Patent No.: US 10,248,608 B2
(45) Date of Patent: Apr. 2, 2019

(54) CONTROLLER CIRCUIT AND METHOD FOR ESTIMATING TRANSMISSION DELAY

(71) Applicant: Silicon Motion, Inc., Jhubei, Hsinchu County (TW)

(72) Inventors: Fu-Jen Shih, New Taipei (TW); Wen-Chi Chao, Hsinchu (TW)

(73) Assignee: SILICON MOTION, INC., Jhubei, Hsinchu County (TW)

( * ) Notice: Subject to any disclaimer, the term of this patent is extended or adjusted under 35 U.S.C. 154(b) by 0 days.

(21) Appl. No.: 15/837,072

(22) Filed: Dec. 11, 2017

(65) Prior Publication Data

US 2018/0181528 A1 Jun. 28, 2018

Related U.S. Application Data

(60) Provisional application No. 62/439,209, filed on Dec. 27, 2016.

(30) Foreign Application Priority Data

Feb. 15, 2017 (TW) .............................. 106104860 A (51) Int. Cl.
*G06F 1/12* (2006.01)
*G06F 13/42* (2006.01)

(52) U.S. Cl.
CPC .............. *G06F 13/423* (2013.01); *G06F 1/12* (2013.01)

(58) Field of Classification Search
None
See application file for complete search history.

(56) References Cited

U.S. PATENT DOCUMENTS

2008/0046771 A1    2/2008    Hsu
2016/0094312 A1    3/2016    Fredriksson et al.

FOREIGN PATENT DOCUMENTS

TW            112021           4/1989

*Primary Examiner* — Idriss N Alrobaye
*Assistant Examiner* — Dayton Lewis-Taylor
(74) *Attorney, Agent, or Firm* — McClure, Qualey & Rodack, LLP (57) ABSTRACT

A controller circuit includes a first signal processing device processing signals in accordance with a first predetermined rule, a second signal processing device processing signals in accordance with a second predetermined rule, a data bus coupled between the first signal processing device and the second signal processing device and comprising multiple data lines, and a confirm signal line coupled between the first signal processing device and the second signal processing device. The first signal processing device transmits a synchronization signal to the second signal processing device via the data bus. The second signal processing device estimates transmission delay on each data line according to the synchronization signal, performs transmission delay compensation on each data line according to the estimated transmission delay and transmits a confirmation signal on the confirm signal line to notify the first signal processing device that the transmission delay compensation is complete.

12 Claims, 8 Drawing Sheets

CONTROLLER CIRCUIT AND METHOD FOR ESTIMATING TRANSMISSION DELAY

CROSS REFERENCE TO RELATED APPLICATIONS

This Application claims the benefit of U.S. Provisional Application No. 62/439,209 filed on Dec. 27, 2016, and entitled "Data Storage Device and Operating Method Thereof", and the entire contents of which are hereby incorporated by reference.

This Application also claims priority of Taiwan Patent Application No. 106104860, filed on Feb. 15, 2017, the entirety of which is incorporated by reference herein.

BACKGROUND OF THE INVENTION

Field of the Invention

The invention relates to a method for estimating transmission delay and compensating for the transmission delay, which is capable of effectively and accurately detecting the internal transmission delay in the data storage device and compensating for the transmission delay to avoid decoding errors at the receiver side.

Description of the Related Art

With the rapid growth in recent years of data storage technology, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In the data storage device, the length of the data trace on the circuit board is an important factor affecting data transmission delay. Any inconsistency in the length of the data trace will cause the data traces to have different transmission delays. A slight difference in length will have a significant impact on the transmission delay, especially in a high-speed data transmission environment. If the transmission delay cannot be compensated for, a decoding error at the receiver side will result.

In light of this, a novel circuit structure and method for estimating transmission delay and compensating for the transmission delay, which is capable of effectively and accurately detecting the internal transmission delay of the data storage device and compensating for the transmission delay to avoid decoding error at the receiver side, are required.

BRIEF SUMMARY OF THE INVENTION

Control circuit and methods for estimating transmission delay are provided. An exemplary embodiment of a control circuit comprises a first signal processing device, a second signal processing device, a data bus and a confirm signal line. The first signal processing device processes signals in accordance with a first predetermined rule. The second signal processing device processes signals in accordance with a second predetermined rule. The data bus is coupled between the first signal processing device and the second signal processing device and comprises a plurality of data lines. The confirm signal line is coupled between the first signal processing device and the second signal processing device. The first signal processing device transmits at least one synchronization signal to the second signal processing device via the data bus. The second signal processing device estimates transmission delay on each data line according to the at least one synchronization signal, performs transmission delay compensation according to the transmission delay estimated on each data line, and transmits a confirmation signal on the confirm signal line to notify the first signal processing device that the transmission delay compensation on the data lines is complete.

An exemplary embodiment of a method for estimating transmission delay, suitable for a controller circuit comprises: transmitting at least one synchronization signal on a data bus, wherein the data bus is coupled between a first signal processing device and a second signal processing device, and wherein the first signal processing device and the second signal processing device are disposed on different platforms; estimating transmission delay on each data line according to the at least one synchronization signal; performing transmission delay compensation according to the transmission delay estimated on each data line; and transmitting a confirmation signal on a confirm signal line when the transmission delay compensation is complete, wherein the confirm signal line is coupled between the first signal processing device and the second signal processing device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1A:
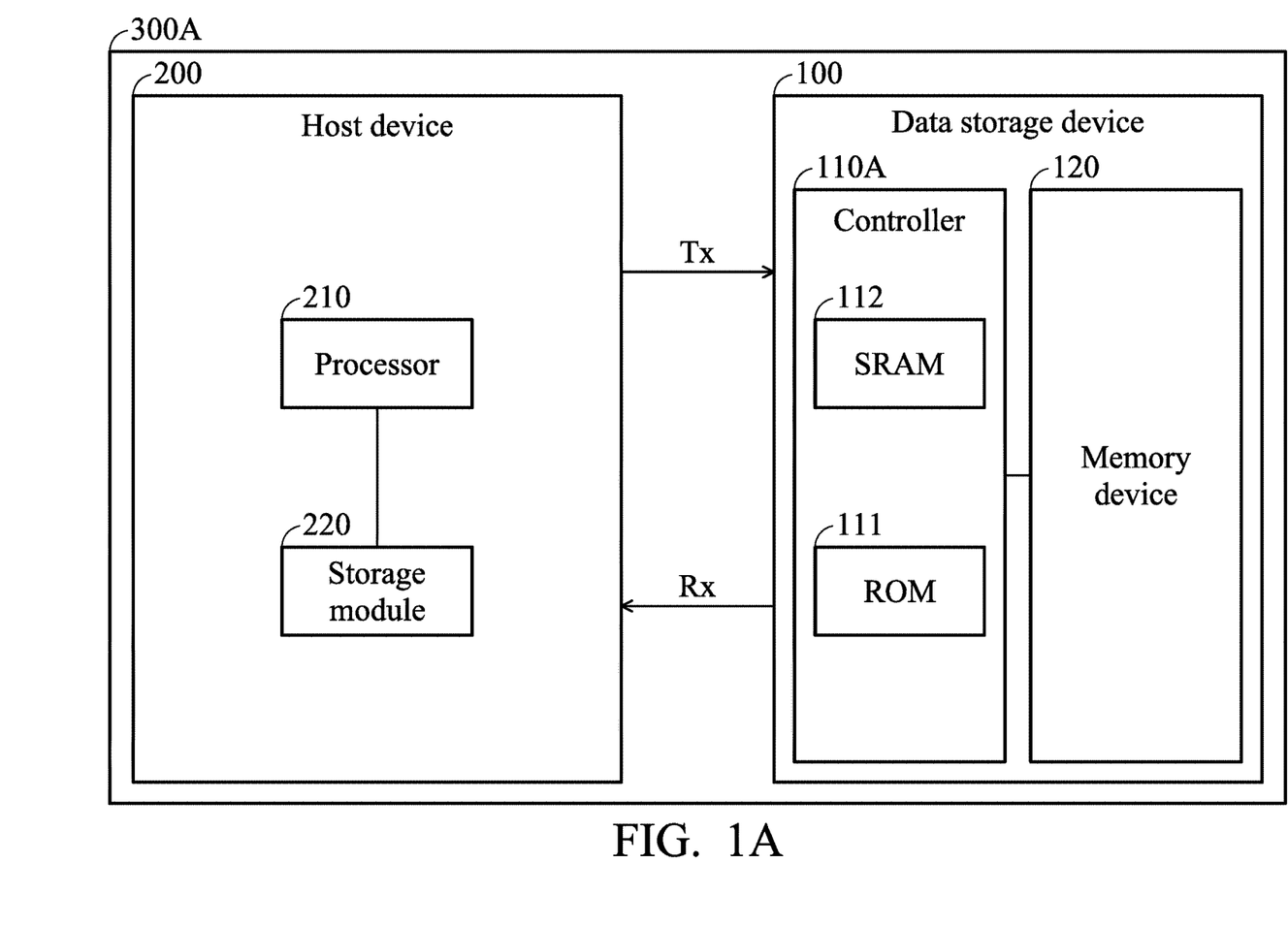
FIG. 1A shows an exemplary block diagram of an electronic device according to an embodiment of the invention.

FIG. 1A shows an exemplary block diagram of an electronic device according to an embodiment of the invention. The electronic device 300A may comprise a data storage device 100 and a host device 200. The data storage device 100 may comprise a controller 110A and a memory device 120. The controller 110A may comprise a Read Only Memory (ROM) 111 and a Static Random Access Memory (SRAM) 112. The memory device 120 may comprise one or more non-volatile memory devices such as a flash memory.

The host device 200 may comprise at least a processor 210 and a storage module 220. For example, the storage module 220 is utilized for recording data which has been accessed (being written and read) by the host device 200. The processor 210 issues commands to access the data storage device 100 according to the requirements, and controls operations of the devices comprised in the host device 200.

The host device 200 may be coupled to the data storage device 100 via a predetermined interface. For example, when the data storage device 100 conforms to the Universal Flash Storage (UFS) standards, the host device 200 may be coupled to the data storage device 100 via the UFS interface. As shown in FIG. 1A, the UFS interface may comprise a transmission path TX to transmit commands and data to the data storage device 100 and a reception path RX to receive command and data from the data storage device 100.

Figure 1B:
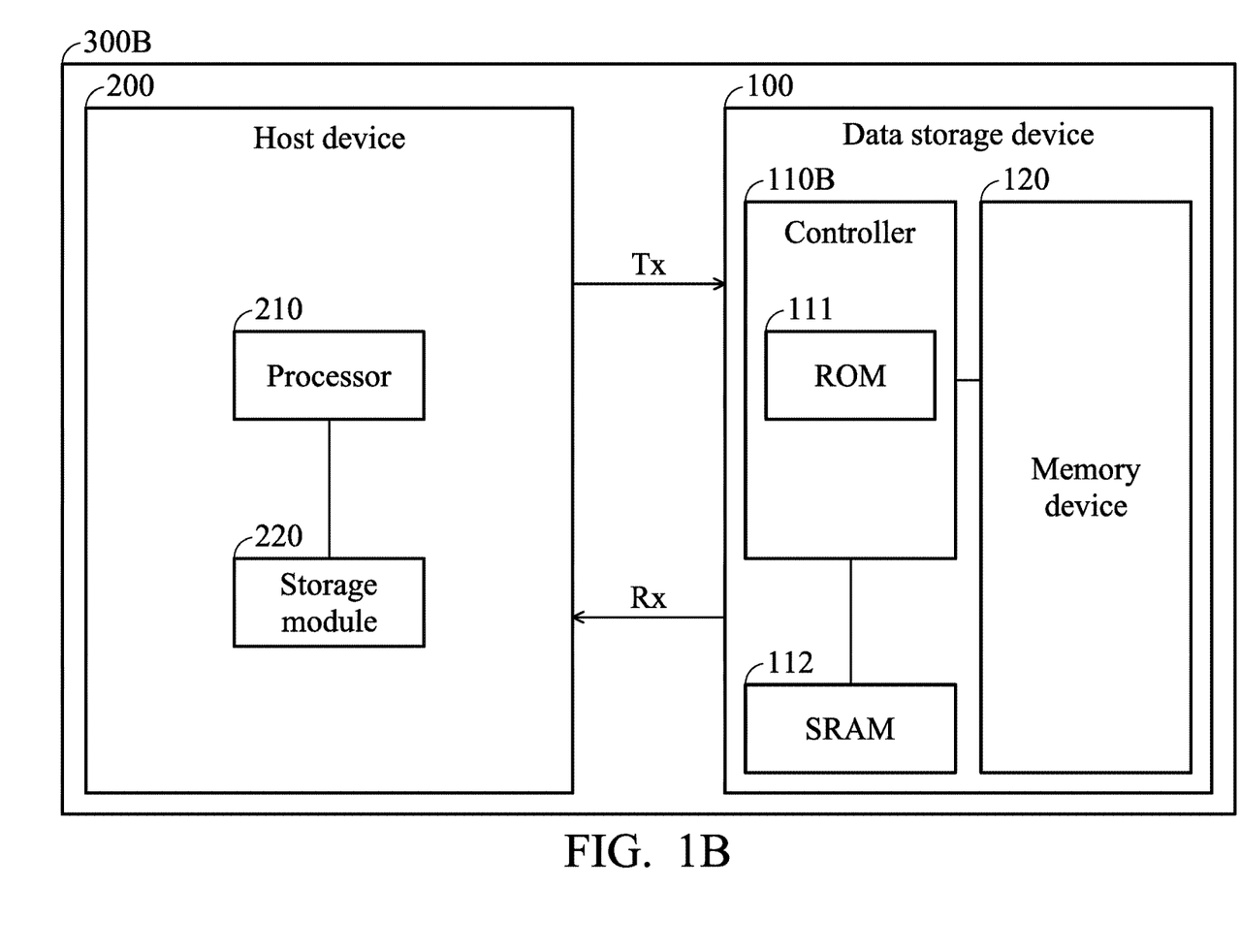
FIG. 1B shows an exemplary block diagram of an electronic device according to another embodiment of the invention.

FIG. 1B shows a block diagram of an electronic device according to another embodiment of the invention. In this embodiment, the SRAM 112 is configured outside of the controller 110B and is coupled to the controller 110B.

In the embodiments as illustrated above, the electronic devices 300A and 300B may be the mobile communications device, such as a smart phone, a smart watch, or tablet computer, but the invention is not limited thereto.

Figure 2:
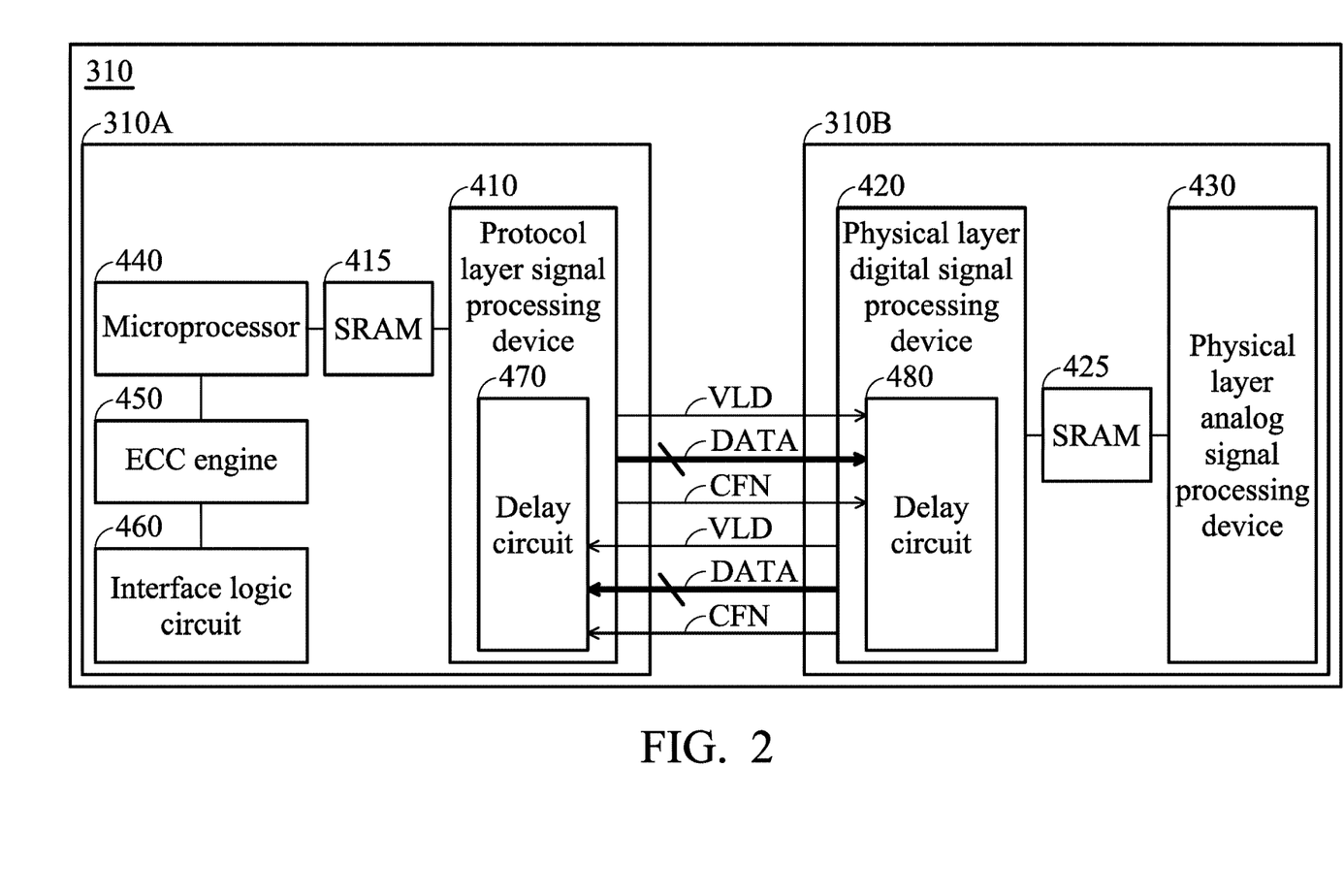
FIG. 2 shows an exemplary block diagram of a controller according to an embodiment of the invention.

FIG. 2 shows an exemplary block diagram of a controller according to an embodiment of the invention. According to an embodiment of the invention, the controller 310 may be the controller comprised in the data storage device, such as the controller 110A or 110B comprised in the data storage device 100 as shown in FIG. 1A or FIG. 1B. In addition, according to an embodiment of the invention, the devices comprised in the controller 310 may be implemented on different platforms. The platform herein may be an FPGA (Field Programmable Gate Array).

Figure 3:
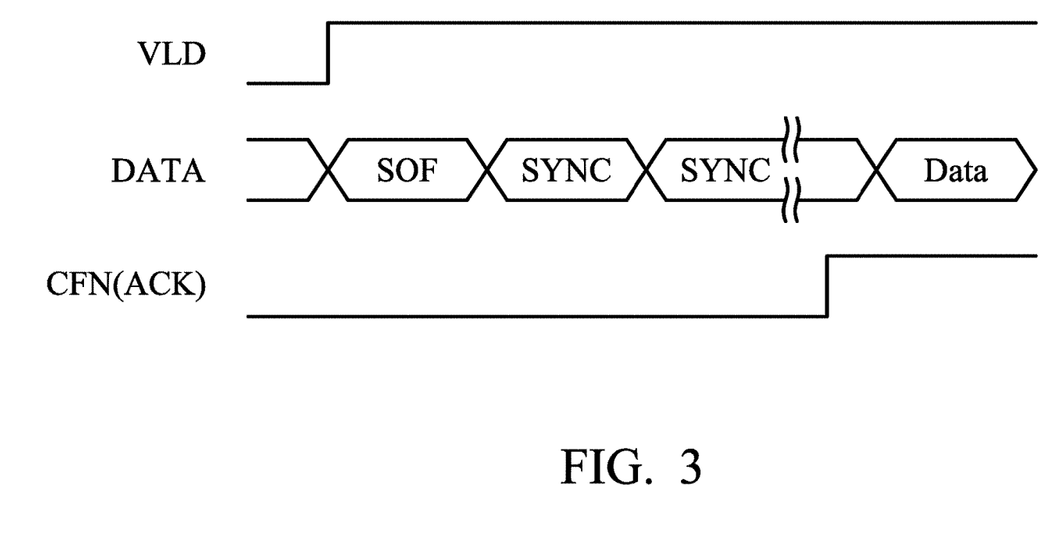
FIG. 3 shows exemplary signal waveforms on the corresponding signal traces according to an embodiment of the first aspect of the invention.

As shown in FIG. 3, the circuit components comprised in the controller 310 may be disposed on different platforms 310A and 310B, where the platforms 310A and 310B are different FPGAs. The platform 310A may at least comprise a protocol layer signal processing device 410, an SRAM (static random access memory) 415, a microprocessor 440, an ECC (Error Correction Code) engine 450 and an interface logic circuit 460. The platform 310B may at least comprise a physical layer digital signal processing device 420, an SRAM 425 and a physical layer analog signal processing device 430.

The physical layer analog signal processing device 430 may process the data signal received from the host device (e.g. the host device 200 as shown in FIG. 1A or FIG. 1B) in accordance with a predetermined rule. For example, the physical layer analog signal processing device 430 may detect the voltage of the received data signal and convert the detected voltage into binary data that is arranged as serial data bits.

The physical layer digital signal processing device 420 may receive the serial data bits from the physical layer analog signal processing device 430 and process the received data bit signals in accordance with a predetermined rule. For example, the physical layer digital signal processing device 420 may convert the serial data bits into parallel data bits. The physical layer digital signal processing device 420 may further transmit the parallel data bits to the protocol layer signal processing device 410 via the data bus DATA. According to an embodiment of the invention, the data bus DATA is the data bus coupled between the physical layer digital signal processing device 420 and the protocol layer signal processing device 410 for transmitting the data bits.

The protocol layer signal processing device 410 may receive the parallel data bits and process the received data bit signals in accordance with a predetermined rule. According to an embodiment of the invention, the protocol layer signal processing device 410 may process the received data bit signals in accordance with the communication protocol defined by the UFS standards. For example, the protocol layer signal processing device 410 may parse the received parallel data bits to into a predetermined format that conforms to the UFS standards. For example, after parsing the data, the start of frame (SOF) of the data frame, payload data, Cyclic redundancy check (CRC) data and end of frame (EOF) of the data frame can be obtained.

The microprocessor 440 may perform computations and control operations of the circuits and devices in the platform 310A. The interface logic circuit 160 may control access operations of the memory device (e.g. the memory device 120) coupled to the controller 310. The ECC engine 450 may generate parity check bits in accordance with the data to be programmed in the memory device.

The signal processing flows as discussed above are the flows when the controller 310 processes the data signals received from the host device. When the controller 310 reads the data from the memory device, the ECC engine 450 may perform ECC checking and correcting functions to check and correct the error bit(s) occurred in the data read from the memory device, and may further provide the corrected data to the protocol layer signal processing device 410.

The protocol layer signal processing device 410 may process the received data bit signals in accordance with a predetermined rule. For example, the protocol layer signal processing device 410 may generate the SOF packet, the EOF packet, etc. for the received data, convert the data bits to parallel data bits, and transmits the parallel data bits to the physical layer digital signal processing device 420 via the data bus DATA.

The physical layer digital signal processing device 420 may process the received data bit signals in accordance with a predetermined rule. For example, the physical layer digital signal processing device 420 may convert the parallel data bits into serial data bits, and transmit the data bit to the physical layer analog signal processing device 430.

The physical layer analog signal processing device 430 may process the received data bit signals in accordance with a predetermined rule. For example, the physical layer analog signal processing device 430 may convert the serial data bits into analog voltage signals and transmit the voltage signals to the host device.

According to an embodiment of the invention, there are a plurality of sets of signal traces, comprising at least a valid data signal line VLD, the data bus DATA, and a confirm signal line CNF, connected between the platforms 310A and 310B.

However, unequal lengths in the signal traces may cause undesirable transmission delays. For example, the data bus DATA may comprise a plurality of data lines D0~Dn, wherein n is a positive integer, for transmitting n bits of data. When the lengths of the data lines D0~Dn are unequal, the transmission delays among the data lines are different. Different delay times may cause undesirable decoding errors at the receiver side.

In the embodiments of the invention, the synchronization signal SYNC is provided for estimating the transmission delay on the data lines/signal traces. In addition, after the estimation and compensation for transmission delay are completed, another device at the peer side is notified via an acknowledge signal (ACK) and/or a ready signal (Ready). Further descriptions will be provided in the following paragraphs. In the following paragraphs, the acknowledge signal (ACK) and the ready signal (Ready) may both be referred to the term of the confirmation signal.

According to an embodiment of the first aspect of the invention, a signal processing device (e.g. the transmitter side) (for example, the protocol layer signal processing device 410 in the platform 310A or the physical layer digital signal processing device 420 in the platform 310B) may insert one or more synchronization signals SYNC in the signals to be transmitted to another signal processing device in another platform (e.g. the receiver side) (for example, the physical layer digital signal processing device 420 in the platform 310B or the protocol layer signal processing device 410 in the platform 310A). The synchronization signals SYNC may be synchronization frames. According to an embodiment of the invention, the signal processing device at the transmitter side may arrange transmission of the synchronization signal SYNC before transmission of the payload data.

According to an embodiment of the invention, the inserted synchronization signals SYNC may comprise the same content, and the content of the synchronization signals SYNC may be previously known (that is, known in advance) by the signal processing devices at both the transmitter side and the receiver side.

FIG. 3 shows exemplary signal waveforms on the corresponding signal traces according to an embodiment of the first aspect of the invention. When the signal processing device at the transmitter side plans to transmit valid data to the receiver side, the signal processing device may pull up the voltage on the valid data signal line VLD to a high voltage level, so as to notify the signal processing device at the receiver side. The signal processing device at the transmitter side may insert one or more synchronization signals SYNC after the start of frame (SOF) packet and before the payload data DATA of the data frame. The signal processing device at the receiver side may adjust or fine-tune the amount of timing delay provided by each delay unit according to the received synchronization signal SYNC, so as to estimate the transmission delay on each data line.

Figure 4:
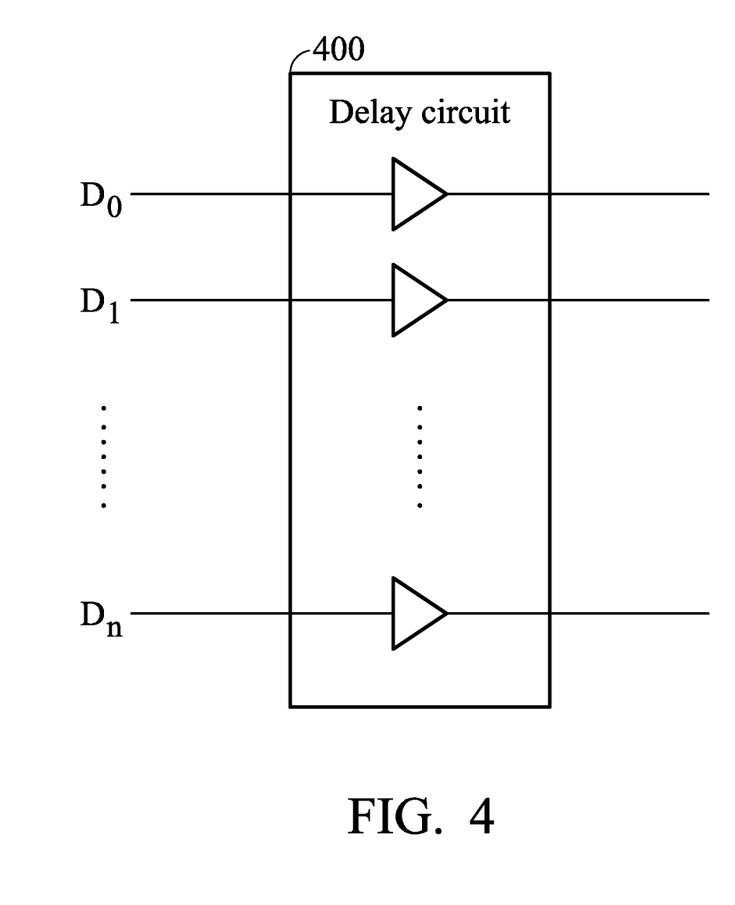
FIG. 4 shows an exemplary circuit diagram of a delay circuit according to an embodiment of the invention.

FIG. 4 shows an exemplary circuit diagram of a delay circuit according to an embodiment of the invention. According to an embodiment of the invention, the protocol layer signal processing device 410 and the physical layer digital signal processing device 420 may respectively comprise a delay circuit 470/480. The delay circuits 470 and 480 may comprise a plurality of delay units as the delay circuit 400 shown in FIG. 4, where each delay unit may be coupled to one data line on the data bus DATA.

According to an embodiment of the invention, in the scenario when the data signal is transmitted from platform 310A to platform 310B, the protocol layer signal processing device 410 is the transmitter side of the data signal and the physical layer digital signal processing device 420 is the receiver side of the data signal. The physical layer digital signal processing device 420 may adjust or fine-tune the amount of delay provided by each delay unit in the delay circuit 480, so as to receive the synchronization signal according to different amount of delay and decode the received synchronization signal to estimate the amount of transmission delay on each transmission line. When the physical layer digital signal processing device 420 is capable of successfully decoding and recognizing the predetermined content of the synchronization signal SYNC, the amount of timing delay currently applied is the estimated transmission delay. The physical layer digital signal processing device 420 may apply the estimated transmission delay on the corresponding delay unit in the delay circuit 480, so as to perform the compensation for transmission delay. The physical layer digital signal processing device 420 may further pull up the voltage on the confirm signal line CNF to a high voltage level, so as to transmit a confirmation signal on the confirm signal line CNF. For example, in this embodiment, the confirmation signal is an acknowledge signal ACK, for notifying the protocol layer signal processing device 410 that the transmission delay compensation on the data lines is complete. Upon receiving the confirmation signal or detecting that the voltage on the confirm signal line CNF has been pulled high, the protocol layer signal processing device 410 may begin transmission of the payload data Data as shown in FIG. 3.

On the other hand, in the scenario when the data signal is transmitted from platform 310B to platform 310A, the physical layer digital signal processing device 420 is transmitter side of the data signal and the protocol layer signal processing device 410 is the receiver side of the data signal. The protocol layer signal processing device 410 may adjust or fine-tune the amount of delay provided by each delay unit in the delay circuit 470, so as to receive the synchronization signal according to different amount of delay and decode the received synchronization signal to estimate the amount of transmission delay on each transmission line. When the protocol layer signal processing device 410 is capable of successfully decoding and recognizing the predetermined content of the synchronization signal SYNC, the amount of timing delay currently applied is the estimated transmission delay. The protocol layer signal processing device 410 may apply the estimated transmission delay on the corresponding delay unit in the delay circuit 470, so as to perform the compensation for transmission delay. The protocol layer signal processing device 410 may further pull up the voltage on the confirm signal line CNF to a high voltage level, so as to transmit a confirmation signal on the confirm signal line CNF. For example, in this embodiment, the confirmation signal is an acknowledge signal ACK, for notifying the physical layer digital signal processing device 420 that the transmission delay compensation on the data lines is complete. Upon receiving the confirmation signal or detecting that the voltage on the confirm signal line CNF has been pulled high, the physical layer digital signal processing device 420 may begin transmission of the payload data Data as shown in FIG. 3. In the embodiments of the invention, the physical layer digital signal processing device 420 is also capable of identifying the start of frame (SOF) packet, the payload data Data and the end of frame (EOF).

According to an embodiment of the invention, before receiving the confirmation signal or detecting that the voltage on the confirm signal line CNF has been pulled high, the signal processing device at the transmitter side may keep or repeatedly transmitting the synchronization signal with the same content on the data bus. The purpose of repeatedly transmitting the synchronization signal with the same content is to allow the signal processing device at the receiver side to receive and decode the synchronization signal according to different amount of timing delay, so as to accurately estimate the transmission delay on the corresponding data line and obtain the acceptable or optimal amount of adjustment of transmission delay for each delay unit.

In the embodiment of the first aspect of the invention, the signal processing device at the transmitter side may transmit the synchronization signal SYNC after pulling up the voltage at the valid data signal line VLD to a high voltage level or transmitting a first valid data (for example, after the start of frame (SOF) packet).

Note that as discussed above, the start of frame (SOF) packet, the synchronization signal SYNC and the payload data Data may be converted as parallel data bits before being transmitted onto the data lines D0~Dn.

In addition, noted that in the embodiments of the first aspect of the invention, because the start of frame (SOF) packet of the data frame is transmitted earlier than the synchronization signal SYNC, the signal processing device at the receiver side may not be able to successfully decode or obtain the correct content of the start of frame (SOF) packet due to the un-compensated transmission delay on each signal trace. Therefore, in the embodiments of the invention, the signal processing device at the receiver side may store or buffer the originally received start of frame (SOF) packet. The start of frame (SOF) packet may be stored in the SRAM 415 or 425, or any buffer or register in the signal processing device at the receiver side. After the transmission delay estimation is complete, the delay circuit of the signal processing device at the receiver side may re-process the buffered start of frame (SOF) packet according to the corresponding estimated transmission delay, so as to compensate for the transmission delay.

According to the embodiments of the second aspect of the invention, the signal processing device at the transmitter side may insert one or more synchronization signals SYNC before the start of frame (SOF) packet to be transmitted to another platform. The inserted synchronization signal SYNC may have the same content and the content of the synchronization signals SYNC may be pre-known (that is, known in advance) by the signal processing devices at both the transmitter side and the receiver side. Therefore, according to the embodiments of the second aspect of the invention, the signal processing device at the transmitter side may transmit the synchronization signal SYNC before transmitting the first valid data.

Figure 5:
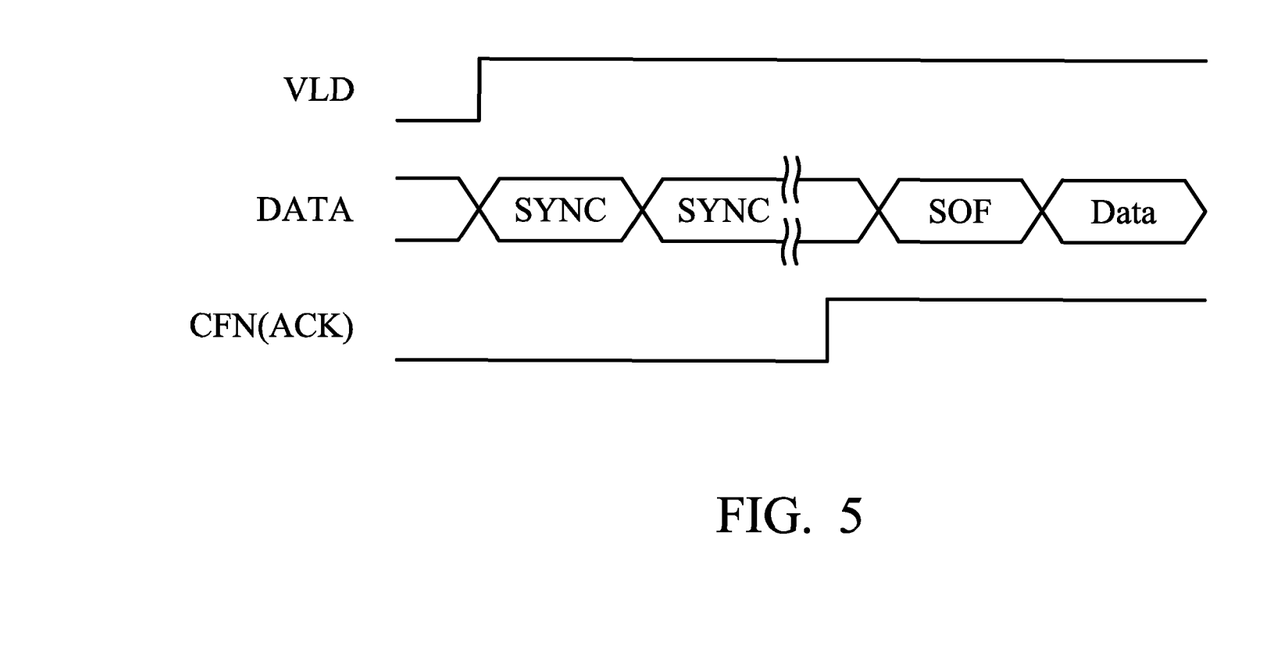
FIG. 5 shows exemplary signal waveforms on the corresponding signal traces according to an embodiment of the second aspect of the invention.

FIG. 5 shows exemplary signal waveforms on the corresponding signal traces according to an embodiment of the second aspect of the invention. Most operations of the embodiments of the second aspect of the invention are similar to that of the embodiments of the first aspect of the invention. For similar operations, reference may be made to the descriptions of the embodiments of the first aspect of the invention, and are omitted here for brevity. The difference between the embodiments of the first and second aspects of the invention is that, in the embodiments of the second aspect of the invention, the start of frame (SOF) packet is transmitted later than the synchronization signal SYNC, and after the voltage on the confirm signal line has been pulled up to a high voltage level or the acknowledge signal ACK is transmitted, the start of frame (SOF) packet is transmitted. Therefore, the signal processing device may directly process the start of frame (SOF) packet according to the estimated transmission delay.

According to the embodiments of the third aspect of the invention, the signal processing device may also use the free time when there is no need to transmit valid data to transmit the synchronization signal SYNC. The transmitted synchronization signals SYNC may have the same content and the content of the synchronization signals SYNC may be pre-known (that is, known in advance) by the signal processing devices at both the transmitter side and the receiver side. Therefore, according to the embodiments of the third aspect of the invention, the signal processing device at the transmitter side may transmit the synchronization signal SYCN before pulling high the voltage on the valid data signal line VLD or before transmitting valid data.

Figure 6:
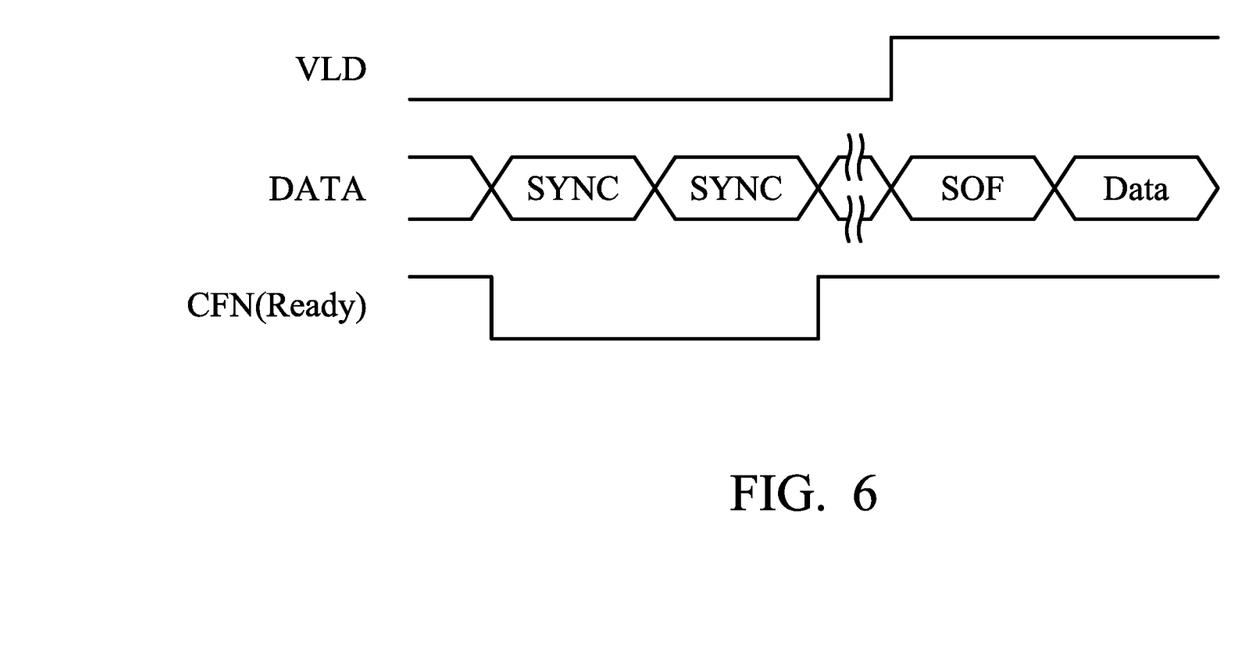
FIG. 6 shows exemplary signal waveforms on the corresponding signal traces according to an embodiment of the third aspect of the invention.

FIG. 6 shows exemplary signal waveforms on the corresponding signal traces according to an embodiment of the third aspect of the invention. In this embodiment, the signal processing device at the transmitter side may keep transmitting one or more synchronization signals SYNC at a time when there is no need to transmit any valid data or before transmitting the valid data. The signal processing device at the receiver side may adjust or fine-tune the amount of timing delay provided by each delay unit according to the received synchronization signal SYNC to estimate the transmission delay on each data line.

Before the signal processing device at the receiver side obtains the acceptable or optimal amount of adjustment of transmission delay for each delay unit, the signal processing device at the receiver side may pull down the voltage on the confirm signal line to a low voltage level, representing that the delay circuit is not yet ready right now. After the signal processing device at the receiver side obtaining the acceptable or optimal amount of adjustment of transmission delay for each delay unit, the signal processing device at the receiver side may pull up the voltage on the confirm signal line to a high voltage level. In this manner, a ready signal (Ready) is generated, to notify the signal processing device at the transmitter side that the delay circuit at the receiver side is ready now and the transmission delay on the signal traces has been compensated for. Therefore, when the signal processing device at the transmitter side receives the ready signal or detects that the voltage on the confirm signal line is pulled high, the signal processing device at the transmitter side can pull the voltage on the valid data signal line VLD up to a high voltage level, and can begin the transmission of valid data, such as the start of frame (SOF) packet and the payload data Data as shown in FIG. 6.

In the embodiments of the third aspect of the invention, since the signal processing device at the transmitter side may use the free time when there is no need to transmit valid data to transmit the synchronization signal SYNC, the signal processing device at the receiver side may estimate the amount of transmission delay on each data line and accordingly adjust the corresponding delay unit in advance. When there is any data that has to be transmitted, since the transmission delay has been compensated for in advance, the signal processing device at the transmitter side may directly transmit the data without waiting until the transmission delay has been performed at the receiver side, as in the embodiments of the first and second aspects of the invention discussed above. For example, when the data transfer speed between the transmitter and the receiver has been adjusted, the transmission delay on each data line may change accordingly. Therefore, the signal processing device at the receiver side may estimate the transmission delay on each data line in advance when there is no need to receive valid data and adjust the amount of timing delay provided by the corresponding delay unit in advance. In this manner, when there is any valid data that has to be transmitted, the signal processing device at the transmitter side may transmit the data right away.

Figure 7:
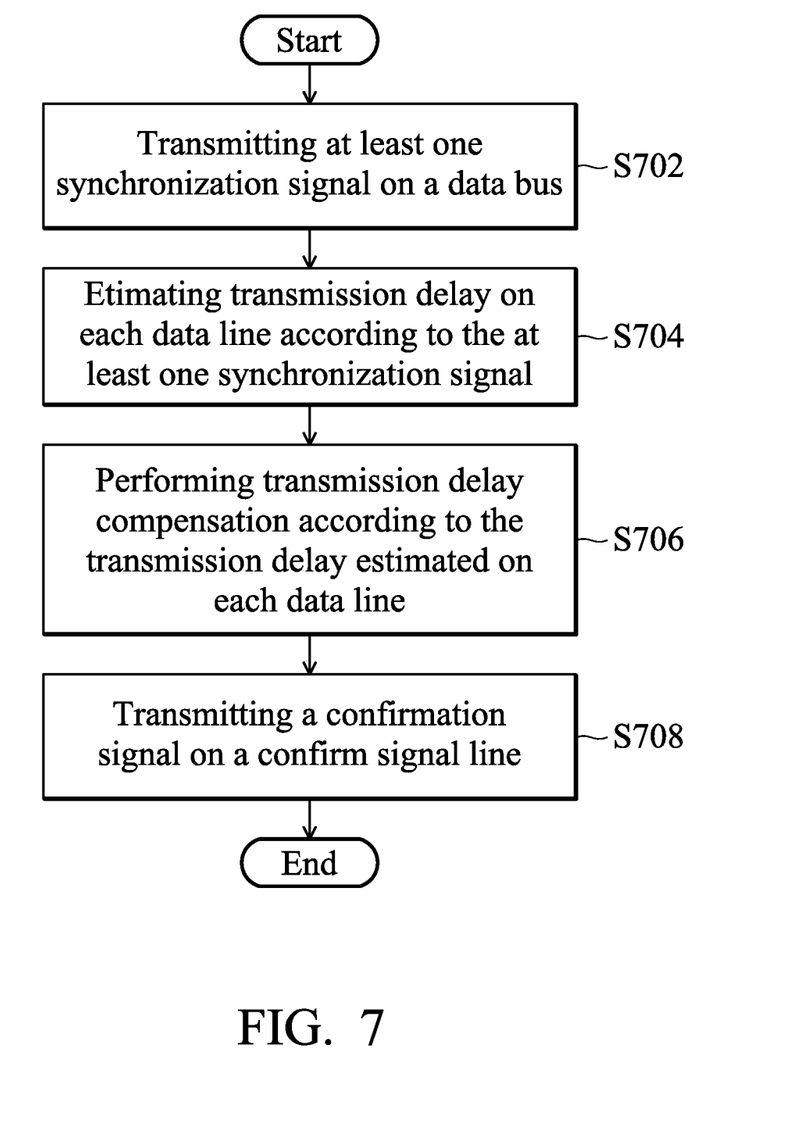
FIG. 7 shows an exemplary flow chart of a method for estimating transmission delay and compensating for the transmission delay according to an embodiment of the invention.

FIG. 7 shows an exemplary flow chart of a method for estimating transmission delay and compensating for the transmission delay according to an embodiment of the invention. First of all, at least one synchronization signal is transmitted on a data bus (Step S702). Next, the transmission delay on each data line is estimated according to the at least one synchronization signal (Step S704). Next, transmission delay compensation is performed according to the transmission delay estimated on each data line (Step S706). Finally, a confirmation signal is transmitted on a confirm signal line when the transmission delay compensation is complete (Step S708).

As discussed above, in the embodiments of the invention, the synchronization signal SYNC is utilized for detecting the transmission delay on the data lines/signal traces, and after the transmission delay has been estimated and compensated for, the acknowledge signal (ACK) or the ready signal (Ready) is utilized to notify another device at the peer side. In this manner, not only can the internal transmission delay inside of the data storage device be effectively and accurately detected, but also the transmission delay can be compensated for, so as to prevent decoding error at the receiver side.

The term "coupling" or "coupled" in the specification refers to various direct or indirect ways of forming an electrical connection. While the invention has been described by way of example and in terms of preferred embodiment, it should be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A controller circuit, comprising:
   a first signal processing device, configured to process signals;
   a second signal processing device, configured to process signals, wherein the first signal processing device and the second signal processing device are disposed on different platforms;
   a data bus, coupled between the first signal processing device and the second signal processing device and comprising a plurality of data lines; and
   a confirm signal line, coupled between the first signal processing device and the second signal processing device,
   wherein the first signal processing device transmits at least one synchronization signal to the second signal processing device via the data bus, the second signal processing device estimates transmission delay on each data line according to the at least one synchronization signal, performs transmission delay compensation according to the transmission delay estimated on each data line and transmits a confirmation signal on the confirm signal line to notify the first signal processing device that the transmission delay compensation on the data lines is complete.

2. The controller circuit as claimed in claim 1, wherein before receiving the confirmation signal, the first signal processing device repeatedly transmits the at least one synchronization signal on the data bus.

3. The controller circuit as claimed in claim 1, wherein the second signal processing device comprises:
   a delay circuit, coupled to the data bus and comprising a plurality of delay units, wherein the second signal processing device adjusts an amount of timing delay provided by the delay units according to the transmission delay estimated on each data line.

4. The controller circuit as claimed in claim 1, wherein the first signal processing device transmits the at least one synchronization signal before transmitting valid data.

5. The controller circuit as claimed in claim 1, wherein the first signal processing device transmits the at least one synchronization signal after transmitting a first valid data.

6. The controller circuit as claimed in claim 1, further comprising:
   a first platform; and
   a second platform,
   wherein the first signal processing device is disposed on the first platform and the second signal processing device is disposed on the second platform.

7. A method for estimating transmission delay, suitable for a controller circuit, comprising:
   transmitting at least one synchronization signal on a data bus, wherein the data bus is coupled between a first signal processing device and a second signal processing device, and wherein the first signal processing device and the second signal processing device are disposed on different platforms;
   estimating transmission delay on each data line according to the at least one synchronization signal;
   performing transmission delay compensation according to the transmission delay estimated on each data line; and
   transmitting a confirmation signal on a confirm signal line when the transmission delay compensation is complete, wherein the confirm signal line is coupled between the first signal processing device and the second signal processing device.

8. The method as claimed in claim 7, further comprising:
   before receiving the confirmation signal, repeatedly transmitting the at least one synchronization signal on the data bus.

9. The method as claimed in claim 7, wherein the step of performing transmission delay compensation according to the transmission delay estimated on each data line further comprises:
   adjusting an amount of timing delay provided by a corresponding delay unit according to the transmission delay estimated on each data line.

10. The method as claimed in claim 7, wherein the step of transmitting the at least one synchronization signal on the data bus further comprises:
    transmitting the at least one synchronization signal before transmitting valid data.

11. The method as claimed in claim 7, wherein the step of transmitting the at least one synchronization signal on the data bus further comprises:
    transmitting the at least one synchronization signal after transmitting a first valid data.

12. The method as claimed in claim 7, wherein content of the at least one synchronization signal is known by the first signal processing device and the second signal processing device in advance.

* * * * *